United States Patent
Jackiewicz

(10) Patent No.: US 12,092,753 B2
(45) Date of Patent: Sep. 17, 2024

(54) MEASURING DISTANCE BETWEEN TWO DEVICES

(71) Applicant: INTERNATIONAL BUSINESS MACHINES CORPORATION

(72) Inventor: Waldemar Jackiewicz, Warsaw (PL)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 17/448,766

(22) Filed: Sep. 24, 2021

(65) Prior Publication Data

US 2023/0097334 A1    Mar. 30, 2023

(51) Int. Cl.
*G01S 5/26* (2006.01)

(52) U.S. Cl.
CPC ....................... *G01S 5/26* (2013.01)

(58) Field of Classification Search
None
See application file for complete search history.

(56) References Cited

U.S. PATENT DOCUMENTS

| | | | |
|---|---|---|---|
| 3,839,717 A * | 10/1974 | Paul ...................... | G08G 1/017 340/904 |
| 5,519,760 A | 5/1996 | Borkowski | |
| 6,414,955 B1 * | 7/2002 | Clare ...................... | H04L 41/12 375/221 |
| 7,796,471 B2 | 9/2010 | Guigne | |
| 7,956,807 B1 | 6/2011 | Celebi | |
| 8,203,910 B2 | 6/2012 | Zhao | |
| 8,644,113 B2 | 2/2014 | Harrell | |
| 9,270,807 B2 | 2/2016 | Shivappa | |

(Continued)

FOREIGN PATENT DOCUMENTS

| | | |
|---|---|---|
| CN | 103503503 A | 1/2014 |
| CN | 106154230 A | 11/2016 |

(Continued)

OTHER PUBLICATIONS

Cobos, Maximo, et al. "Simultaneous ranging and self-positioning in unsynchronized wireless acoustic sensor networks." IEEE Transactions on Signal Processing 64.22 (2016): 5993-6004. (Year: 2016).*

(Continued)

*Primary Examiner* — Isam A Alsomiri
*Assistant Examiner* — Jonathan D Armstrong
(74) *Attorney, Agent, or Firm* — Yee & Associates, P.C.

(57) ABSTRACT

A method for geolocating a mobile computing device within an indoor environment. One embodiment may comprise generating a geolocation request audio signal by a speaker of a first device starting at a first point in time, receiving, by a microphone of the first device, a reply audio signal from a second device, and extracting, by one or more processors of the first device, information encoded in the reply audio signal. The method may further comprise estimating, by the one or more processors, a receipt time by the first device for the reply audio signal and calculating a first time of flight (TOF) using the first point in time and the estimated receipt time for a second audio signal. The first device may comprise a smartphone and the second device may comprise a beacon located at a known location in an indoor environment.

20 Claims, 12 Drawing Sheets

(56) References Cited

U.S. PATENT DOCUMENTS

| | | | |
|---|---|---|---|
| 9,412,387 | B2 | 8/2016 | Davis |
| 9,451,377 | B2 | 9/2016 | Massey |
| 9,506,761 | B2 | 11/2016 | Chen |
| 9,733,091 | B2 | 8/2017 | Kordari |
| 9,894,531 | B2 | 2/2018 | Li |
| 9,952,309 | B2 | 4/2018 | Davis |
| 10,254,383 | B2 | 4/2019 | Bradley |
| 2003/0142587 | A1* | 7/2003 | Zeitzew .............. G01S 7/52004 367/127 |
| 2008/0157970 | A1* | 7/2008 | Single ................ G08B 21/0244 340/572.1 |
| 2011/0170430 | A1 | 7/2011 | Yan |
| 2014/0355785 | A1 | 12/2014 | Taylor |
| 2015/0106310 | A1* | 4/2015 | Birdwell ................ G06N 3/02 706/26 |
| 2015/0195088 | A1* | 7/2015 | Rostami ................ H04L 9/3278 380/28 |
| 2018/0252793 | A1 | 9/2018 | Hazlewood |
| 2018/0255429 | A1 | 9/2018 | Hazlewood |

FOREIGN PATENT DOCUMENTS

| | | | | |
|---|---|---|---|---|
| CN | 106353731 | A | 1/2017 | |
| CN | 107192984 | A | 9/2017 | |
| CN | 208092219 | U | 11/2018 | |
| CN | 110646764 | A | 1/2020 | |
| CN | 110967670 | A | 4/2020 | |
| CN | 112188616 | A | 1/2021 | |
| CN | 112566056 | A | 3/2021 | |
| EP | 3114496 | A2 | 8/2020 | |
| EP | 3583748 | B1 | 3/2021 | |
| JP | 2012211910 | A | 11/2012 | |
| WO | WO-03062850 | A2 * | 7/2003 | ............. G01S 15/46 |
| WO | 2010070526 | A1 | 6/2010 | |
| WO | 2012125269 | A1 | 9/2012 | |
| WO | 2015181578 | A1 | 12/2015 | |
| WO | 2018160570 | A1 | 9/2018 | |
| WO | 2019166988 | A2 | 9/2019 | |
| WO | 2023047318 | A1 | 3/2023 | |

OTHER PUBLICATIONS

Lazik, Patrick, and Anthony Rowe. "Indoor pseudo-ranging of mobile devices using ultrasonic chirps." Proceedings of the 10th ACM Conference on Embedded Network Sensor Systems. 2012. (Year: 2012).*

Tsuji, Reo, et al. "Code set design for digital polarity correlators in a multiple user sonar ranging system." SICE 2003 Annual Conference (IEEE Cat. No. 03TH8734). vol. 2. IEEE, 2003. (Year: 2003).*

Patent Cooperation Treaty PCT, International Search Report and Written Opinion, International Application No. PCTIB2022/058952, Date of mailing Dec. 16, 2022, 8 pages.

De Angelis et al, Design and Characterization of a Portable Ultrasonic Indoor 3-D Positioning System, IEEE Transactions on Instrumentation and Measurement, pp. 1-10, 0018-9456 © 2015, <https://ieeexplore.ieee.org/document/7110326>.

Kadaba et al, "Indoor Positioning System using Ultrasound", International Journal of Engineering Research & Technology (IJERT), ISSN: 2278-0181, NCESC—2018 Conference Proceedings, vol. 6, Issue 13, pp. 1-7, <www.ijert.org>.

Medina et al., "Ultrasound Indoor Positioning System Based on a Low-Power Wireless Sensor Network Providing Sub-Centimeter Accuracy", Sensors 2013, 13; doi:10.3390/s130303501, pp. 1-26, ISSN 1424-9220, <www.mdpi.com/journal/sensors>.

Mobile phone tracking, Wikipedia, https://en.wikipedia.org/wiki/Mobile_phone_tracking. Retrieved from internet on Sep. 15, 2021.

Simoes et al., "A Hybrid Indoor Positioning System Using a Linear Weighted Policy Learner and Iterative PDR", ResearchGate, doi: 10.11009/ACCESS.2020.2977501, Mar. 2020, p. 1-28, <https://www.researchgate.net/publication/339636078>.

D. Niculescu and B. Nath, "Ad hoc positioning system (APS)," GLOBECOM'01. IEEE Global Telecommunications Conference (Cat. No. 01CH37270), 2001, pp. 2926-2931 vol. 5, doi: 10.1109/GLOCOM.2001.965964.

Jorge Herrera and Hyung-Suk Kim , "Ping-pong: Using smartphones to measure distances and relative positions", The Journal of the Acoustical Society of America 134, 4134-4134 (2013) https://doi.org/10.1121/1.4831185.

* cited by examiner

MEASURING DISTANCE BETWEEN TWO DEVICES

BACKGROUND

The present disclosure relates to geolocation, and more specifically, to geolocation in indoor environments.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One popular application of these capabilities is the mobile computing device, such as smartphones, tablets, laptops, wearable devices, and personal digital assistants (PDAs). Many of these mobile computing devices include a global positioning system (GPS) receiver. The GPS system, in turn, generally refers to a collection of satellites that provide geolocation and time information anywhere on or near the Earth. The GPS system has been used for outdoor navigation, outdoor geo-positioning, and outdoor geo-tagging solutions, as well as many outdoor marketing and outdoor social media applications.

Some smartphones may also estimate a geolocation using the network infrastructure of their associated service providers. Some such smartphones can determine a coarse sector in which the device is located by identifying one or more nearby cellular towers. Some systems may further estimate a distance to those cellular towers by measuring power levels and antenna patterns. In this way, some such systems may achieve a precision of about 50 meters in urban areas, where the density of cellular towers is relatively high. Rural areas, in contrast, may have miles between cellular towers, and therefore, may not allow a location to be determined to even that level of precision.

SUMMARY

According to embodiments of the present disclosure, a method for geolocating a mobile computing device within an indoor environment, comprising generating a geolocation request audio signal by a speaker of a first device starting at a first point in time, receiving, by a microphone of the first device, a reply audio signal from a second device, and extracting, by one or more processors of the first device, information encoded in the reply audio signal. The method may further comprise estimating, by the one or more processors, a receipt time by the first device for the reply audio signal and calculating a first time of flight (TOF) using the first point in time and the estimated receipt time for a second audio signal. The first device may comprise a smartphone and the second device may comprise a beacon located at a known location in an indoor environment.

According to embodiments of the present disclosure, a method for geolocating a mobile computing device within an indoor environment, comprising receiving, at a microphone of a second device, a first audio signal generated by a first device, extracting, by one or more processors of the second device, information encoded in the first audio signal, the information including a fingerprint associated with the first device, and estimating, by the one or more processors, a receipt time for the first audio signal. The method may further comprise generating, by the one or more processors, a reply signal, the reply signal including the fingerprint, and transmitting, by a speaker of the second device after a predetermined wait time after the estimated receipt time, the reply signal. The method may further comprise modulating the reply signal onto a carrier wave, the carrier wave having a frequency in a predetermined range of frequencies. The first device may comprise a smartphone and the second device may comprise a beacon located at a known location in an indoor environment.

According to embodiments of the present disclosure, a geolocation beacon, comprising a processor coupled to a memory. The processor and the memory may be configured to receive a geolocation request audio signal, extract information encoded in the request audio signal, analyze the extracted information to estimate a receipt time for geolocation request audio signal, generate a reply signal to the geolocation request audio signal, broadcast the reply signal beginning a predetermined wait time after the estimated receipt time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
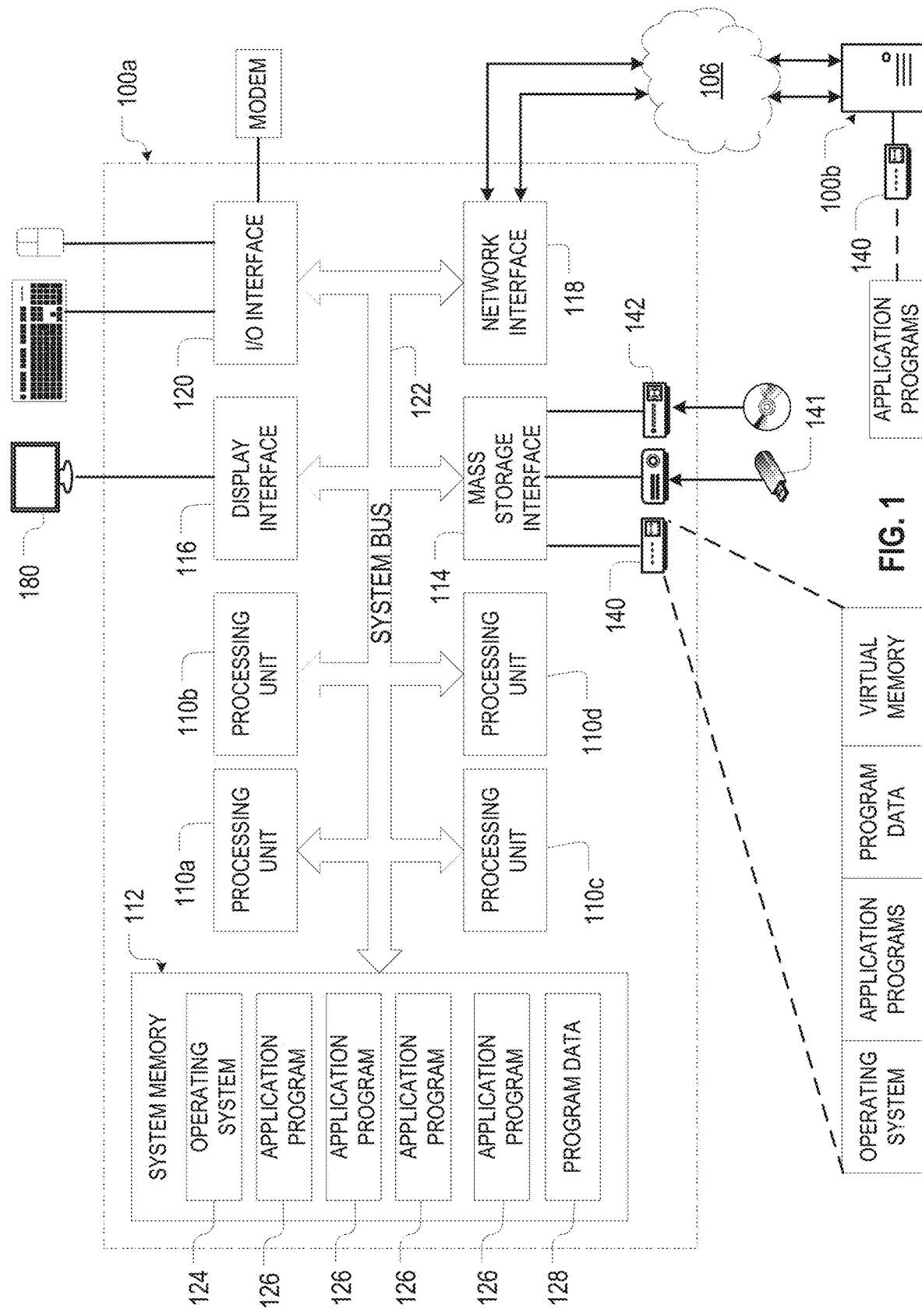
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to geolocation; more particular aspects relate to geolocation in indoor environments. While the present disclosure is not necessarily limited to such applications, various aspects of the disclosure may be appreciated through a discussion of various examples using this context.

Many retail organizations operate megastores, which may offer 1000-2000 items spread across a large retail space. To help customers manage these giant store sizes and huge product diversity, some embodiments of this disclosure may include a shopping assistant. The retail organizations may provide these shopping assistants to help their customers locate items within the megastore. Shopping assistants consistent with some embodiments may include a speech-to-text system to receive voice commands from the customer. The shopping assistant may then identify what item is being sought, query a server for its location, and then present responsive directions. This may include personalized, step-by-step directions to the desired item, which may be presented via maps, voice, and/or text.

Some embodiments of the shopping assistant be provided as a software application ("app") designed to execute on a mobile computing device owned and provided by the customer, such as a personal smartphone. These apps may be delivered to the customer's mobile device via an application store ("app store") maintained by the retailer and/or by a third party service provider. While many of these mobile devices include some built-in geolocation capability, the built-in geolocation capability does not provide sufficient reliability and/or accuracy when the mobile device is indoors to enable the personalized, step-by-step directions described above. Accordingly, one feature and advantage of some embodiments is a repeatable method for measuring distance between two devices while indoors and with sub-centimeter accuracy. Another feature and advantage of some embodiments is a repeatable method for using the measured distances to geolocate the mobile device within the indoor environment with sub-centimeter accuracy.

Some embodiments may utilize an audible signal that can be generated and/or received by most models of smartphones to communicate signals between one device and another. These audio signals may be at a frequency above or below the range at which humans can perceive, and may be used to measure a distance between the two devices. Moreover, the distance may be measured without clock synchronization and/or calibration between the devices. This feature and advantage may allow some embodiments to be performed on an ad-hoc basis (e.g., on smartphones provided by customers). Some embodiments may further include machine learning and streaming analysis to improve geolocation accuracy, such that they may provide sub-centimeter precision. The machine learning and streaming analysis may be performed on the mobile device in some embodiments. In other embodiments, machine learning and streaming analysis may be performed remotely by a cloud server, or in a hybrid mode (e.g., trained on a cloud server and then executed on the mobile device).

Some embodiments may allow measurement of indoor distances between a transmitter device and a receiver device with sub-centimeter accuracy. These distance measurement features may, in turn, be used to provide a GPS-like mobile positioning solution for indoor navigation purposes that do not require clock and/or device synchronization. This indoor geolocation service may support fully asynchronous interaction with each of a plurality of positioning beacons, at distances limited only by the range at which the sound can be detected (e.g., up to tens of meters). Additionally, this range can be extended by using the mobile devices as additional, ad-hoc beacons.

Another aspect of this disclosure is a system and method for calculating distance between two devices that can generate (e.g., by a speaker), receive (e.g., by a microphone), and analyze signals encoded as audio and/or ultrasound. One feature and advantage of some embodiments is that, regardless of whether the audio or ultrasound waves may be used as a transmission media for the signals, the accuracy will be the same. This feature and advantage may permit multiple devices to simultaneously determine their respective locations within the indoor environment via frequency multiplexing. Another feature and advantages of some embodiments include that the beacons' clocks need to be synchronized. This feature and advantage may allow for the mobile devices to be used as additional beacons once their location has been determined, thereby preventing dead spots where location cannot be determined and/or extending the coverage of the system as a whole.

Another feature and advantages of some embodiments is that methods may be performed locally, by the mobile devices, i.e., central system is not required to calculate and inform positioned devices about their respective geolocations. This decentralized geolocation feature may be desirable to protect the customers' privacy. Another feature and advantages of some embodiments is that the methods may be performed on relatively lower power, non-specialized hardware, such as a typical customer's smartphone. Another feature and advantages of some embodiments is that methods do not require a global database of active beacons and their geolocations. Another feature and advantages of some embodiments is that the beacons do not need to be network attached, and thus, can be installed easily within the indoor environment. Another feature and advantages of some embodiments is that changes in the network infrastructure do not need to be propagated to all possible devices. Another feature and advantages of some embodiments is that the methods may enable geolocation in places a preexisting noise map does not exist, in unknown/uncontrolled spaces (e.g., with potential for interaction with unknown objects), and/or when background noises are significant and/or difficult to recognize. These features and advantages may be particularly desirable in a disaster recovery application. Another feature and advantages of some embodiments is that the methods may not require frequent/continuous deep learning model improvement and neural network reeducation.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The one or more direct access storage devices 140 may be logically organized into a RAID array, which in turn, may be managed by a RAID controller 115 in e.g., the mass storage interface 114, by software executing on the processor 110, or a combination of both. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
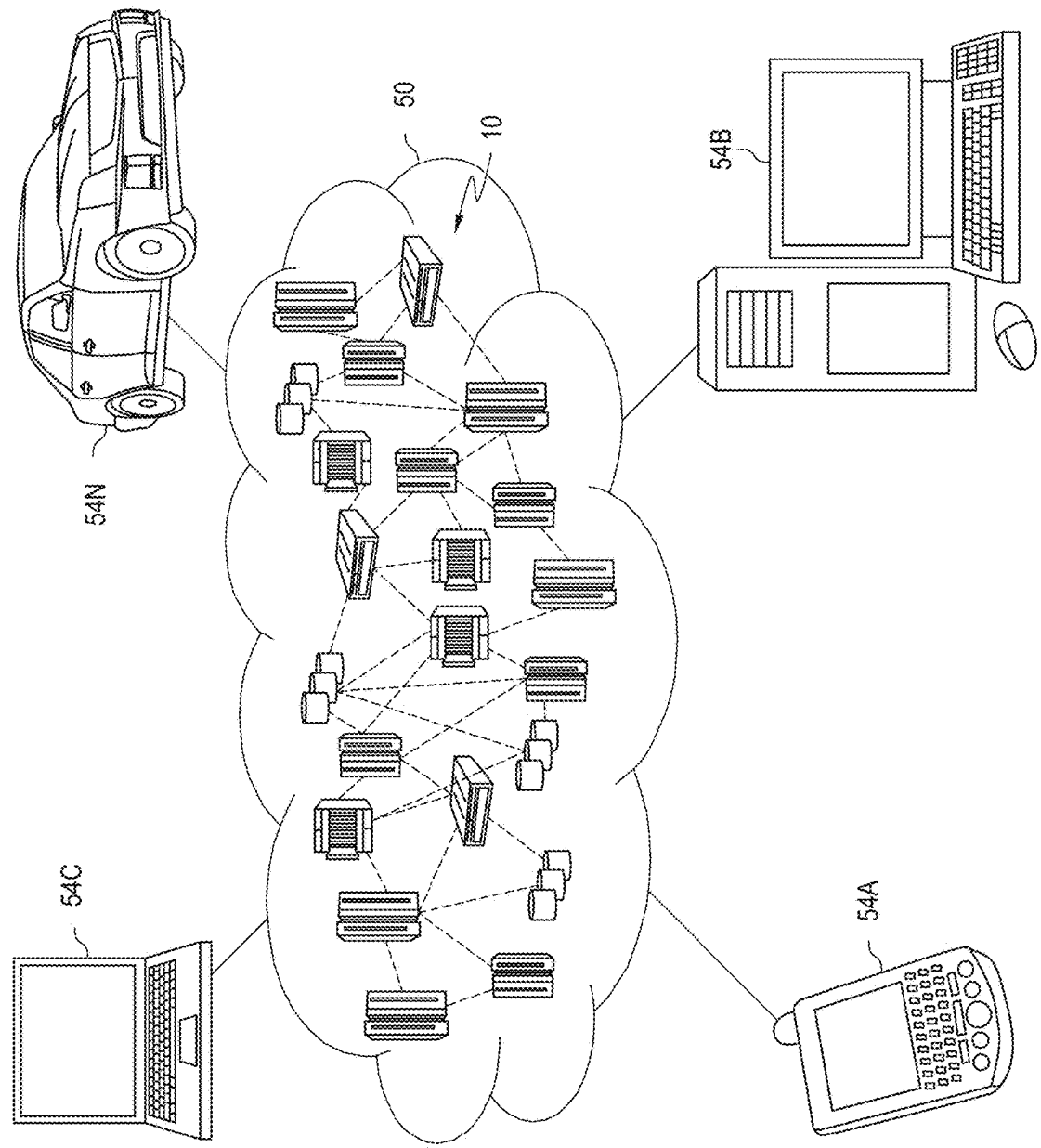
FIG. 2 depicts illustrative cloud computing environment.

FIG. 2 illustrates one embodiment of a cloud environment suitable for providing a geolocation service, including a machine learning model. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
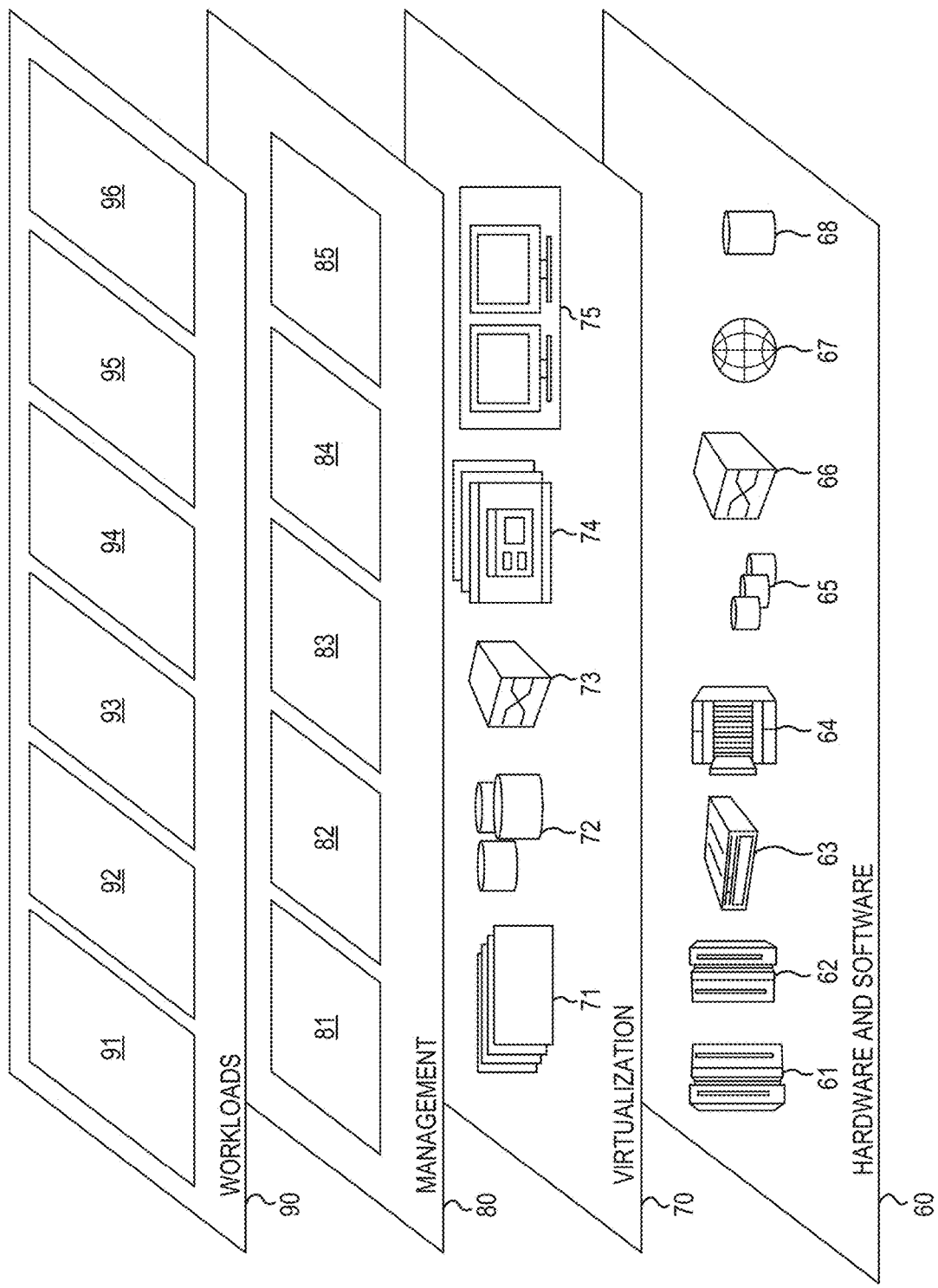
FIG. 3 sows a set of functional abstraction layers provided by cloud computing environment of FIG. 2.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and geolocation service 96.

Indoor Geolocation

Figure 4:
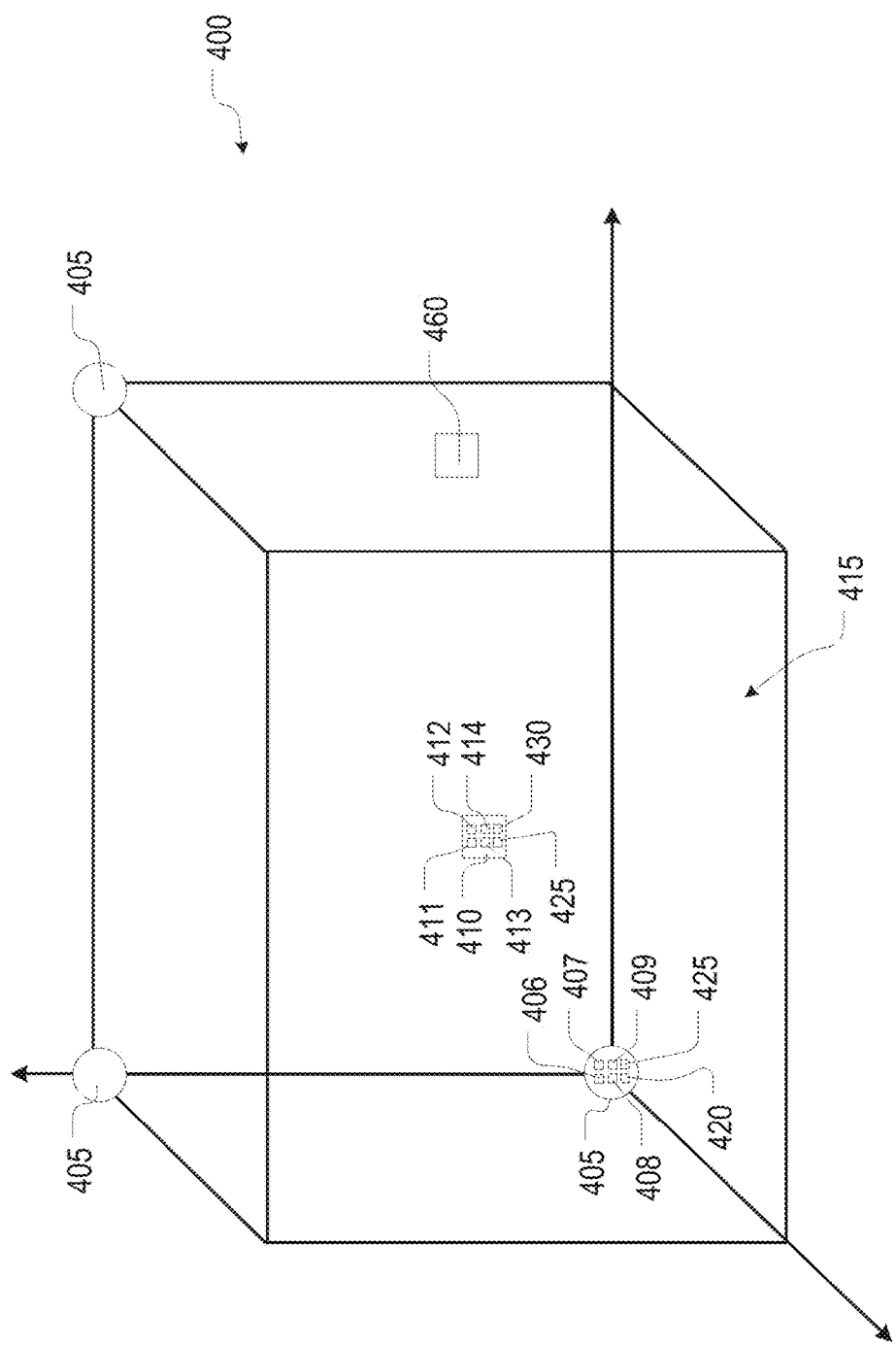
FIG. 4 illustrates a system for determining the location of a mobile device, consistent with some embodiments.

FIG. 4 illustrates a system 400 for determining the location of a mobile device 410, consistent with some embodiments. In this embodiment, the system 400 comprises three or more repeater beacons (beacons, one depicted in more detail for clarity) 405, a first mobile device 410, and a second mobile device 460. Initially, each of the beacons 405 and the first mobile device 410 are within sound range of each other. That is, the first mobile device 410 can receive and decode signals transmitted via sound waves transmitted from each of the beacons 405, and each of the beacons can receive and decode signals transmitted via sound waves transmitted from the first mobile device 410.

In this embodiment, the beacons 405 and the first mobile device 410 are in active mode, such that they can receive and transmit data using sound waves as a carrier. The data may be encoded into the sound waves using frequency modulation. A frequency of a carrier wave for the frequency modulation may be determined in advance, or may vary within some limited range to provide flexibility in the event of a noisy background sound and/or to allow for frequency multiplexing.

In operation, a processor of the first mobile device 410 may initially generate a signal containing a well-known pattern ("handshake") and a unique identifier ("fingerprint") at a time T0. As will be discussed in more detail below, the handshake may be used by one of the beacons 405 to help identify and distinguish a transmitted audio signal from background noise, and the fingerprint may be used by the first mobile device 410 to recognize a reply to its geolocation request. A communication protocol that defines the communication between the first mobile device 410 and the beacon 405 may specify a data frame for the fingerprint and handshake, as well as a limited scope of frequencies to use as a carrier wave. The data frame may be modulated onto the carrier wave using frequency modulation techniques, with the high and low levels of that signal representing data bits. The modulated signal may then be converted into sound waves using an embedded speaker 412 and broadcast to other devices in the space 415.

The beacon(s) 405 may receive the sound waves from the first mobile device 410 using an embedded microphone 406. A repeater application 408 executing on the beacon 405 may extract the embedded signal by sampling those audio signals and transforming them into corresponding binary signals. Because the beacons 405 do not know ahead of time that a valuable signal (e.g., a data frame) is coming (vs. receiving mere background noise), the repeater application 408 may save the entire stream of data (i.e., binary signals corresponding to all received audio) in a first shift register 409 in some embodiments. This first shift register 413 may be circular, such that a predetermined number of seconds of the signal may be continuously stored for later analysis. The first shift register 409 may be long enough to store at least a number of samples sufficient to represent a full size of expected data frame e.g., 500-1000 samples for 50-100 bits long data string. Additionally, each recognized bit of data may have an associated uncertainty confidence level, which may be further utilize, e.g., by the AI model 425 to recognize expected patterns. Shifting an expected length of the data bits (e.g., how long one data bit is in milliseconds) may also influence this confidence level and allow assessment of the correct signal frequency from a particular signal source.

The repeater application 408 may continuously analyze the first shift register 409, looking for the handshake pattern, which may indicate that the first shift register 409 contains an audio signal from a mobile device 410. This operation may include testing a current content of first shift register 409 using the specified time frame with respect to each potential bit. A criteria for this analytics may be achieving contrast between extreme values e.g., that is greater than a threshold, indicating receipt of values representing the low and high state of data bits. In other embodiments, this operation may include feeding the contents of the first shift register 409 to a deep learning model 425, which may generate a probability score for whether a portion of the first shift register 409 may be decoded into a corresponding data frame. In these embodiments, an additional or alternative criteria may be whether the calculated a probability of correctly decoding of corresponding data frame is greater than a threshold.

When a potential handshake pattern is found (i.e., a fit that matches the expected pattern at greater than a predetermined confidence value), then the repeater application 408 may transfer data corresponding to a potential frame to a second shift register 420. This second shift register 420 may be shorter than the first shift register 409, e.g., of a length similar to the length of a data frame specified by a protocol. A reverse calculation may then be performed to calculate the exact time (T1) at which the beginning of signal should have been received. That is, if the beacon 405 did not receive and/or did not recognize the start of the signal due to background noise, then the repeater application 408 may calculate T1 using the portion of the signal that was received/recognized, together with the location of a recognized portion of the signal within the specified data frame format. This may include re-generating portions of the original signal from the mobile device 410 that were not received and/or recognized by the beacon 405, if necessary.

In a next phase, the repeater application 408 may generate a reply signal. This reply signal may include the received fingerprint from the mobile device 410. The reply signal may also contain a fingerprint, which may be the same as used by the mobile device 410 or may be a different pattern. The reply signal may also contain a geolocation (e.g., coordinates of its location) of the beacon 405 within the space 415, or may contain a unique identifier (e.g., a beacon fingerprint) for the beacon 405 that the first mobile device 410 may use to lookup the beacon's geolocation.

The reply signal may then be encoded onto a carrier wave using frequency or amplitude modulation. The resulting signal may be broadcast back to the first mobile device 410 as a sound wave generated by an embedded speaker 407 a predetermined/fixed number of seconds after T0. That is, the reply signal may not be sent immediately after generation/encoding in some embodiments. Instead, the repeater application 408 may wait until the predetermined/fixed number of seconds has passed since T1 before beginning to broadcast the reply signal. This wait time (WT) can be any time interval, but it should be agreed upon by both parties ahead of time. In one example embodiment, WT=0.2 seconds.

After the reply signal (with the handshake, fingerprint, and geolocation) is broadcast, the reply may be received by the microphone 411 of the first mobile device 410. A mobile app executing on the first mobile device 410 may sample the received audio, transform it to a digital signal, and store the result in its own first shift register 414. The mobile device 410 may then analyze the first shift register 414 to identify the handshake and/or the fingerprint, store part of the associated signal in its own second shift register 430, and then use the location of the handshake and/or fingerprint within the data-frame to calculate the exact time (T2) at which the beginning of reply signal should have been received. As will be discussed in more detail below, the difference between T2 and T0, together with the predetermined wait time WT, may then be used to calculate a time of flight (ToF) of the audio signals used in the geolocation request. The ToF, together with a known speed of sound, may be used to calculate a distance between two devices 405, 410.

The above method may be repeated for each of the beacons 405. After a distance from the mobile device 410 to two or more of the beacons 405 has been determined (three or more, if a geolocation in three dimensions is desired), a current location of the mobile device 410 may be calculated in using triangulation. The above geolocation method may be then be repeated at a later time, and the difference between the two geolocations may be used calculate a speed and direction of travel of the mobile device 410.

Later, once the location of the mobile device 410 has been calculated, the geolocation method described above may be used to recognize the position of the second mobile device 460 using, in part, the first mobile device 410. The second mobile device 460 in FIG. 4 may be within sound range of the first mobile device 410, but out of sound range of one the beacons 405. In FIG. 4, the first mobile device 410 may respond to audio pulses from the second mobile device 460 in the same manner as did the beacon(s) 405 described above. That is, the first mobile device 410 may first calculate its own geolocation using the set of static beacons 405. Next, the first mobile device 410 may then act as a reference for the second mobile devices 460, in lieu of one of those static beacons 405. In this way, the first mobile device 410 may act as a dynamic and temporary extension of system beacons 405 in the space 415. These embodiments may be desirable because they may be used in portions of the space 415 where beacon coverage is sparse and/or where environment background sound conditions may be difficult to be manage by the beacons 405 alone. For example, these embodiments may be desirable when used as a temporary, ad-hoc geolocation system at the site of a natural disaster, or to provide coverage in some relative deadspot within the indoor space 415. Additionally or alternatively, the above methods may be desirable to calculate a distance map between moving devices in the space 415 without any static beacons 405, e.g., to measure distance and location of a group of robots inside a building versus a location of other robots.

One feature and advantage of some embodiments in FIG. 4 is that they may allow for geolocation using an ad-hoc collection of simple and common first mobile devices 410, 460, such as smartphones often carried by customers, because these embodiments may only require one transmission media, such as sound, in lieu of more expensive and dedicated devices that measure simultaneously two different media, like radio and sound. Moreover, the calculations performed by this ad-hoc collection of mobile devices 460 do not require clock synchronization between the pairs of devices 405, 410, 460, as the wait time WT may be specified by a predetermined protocol.

Figure 5A:
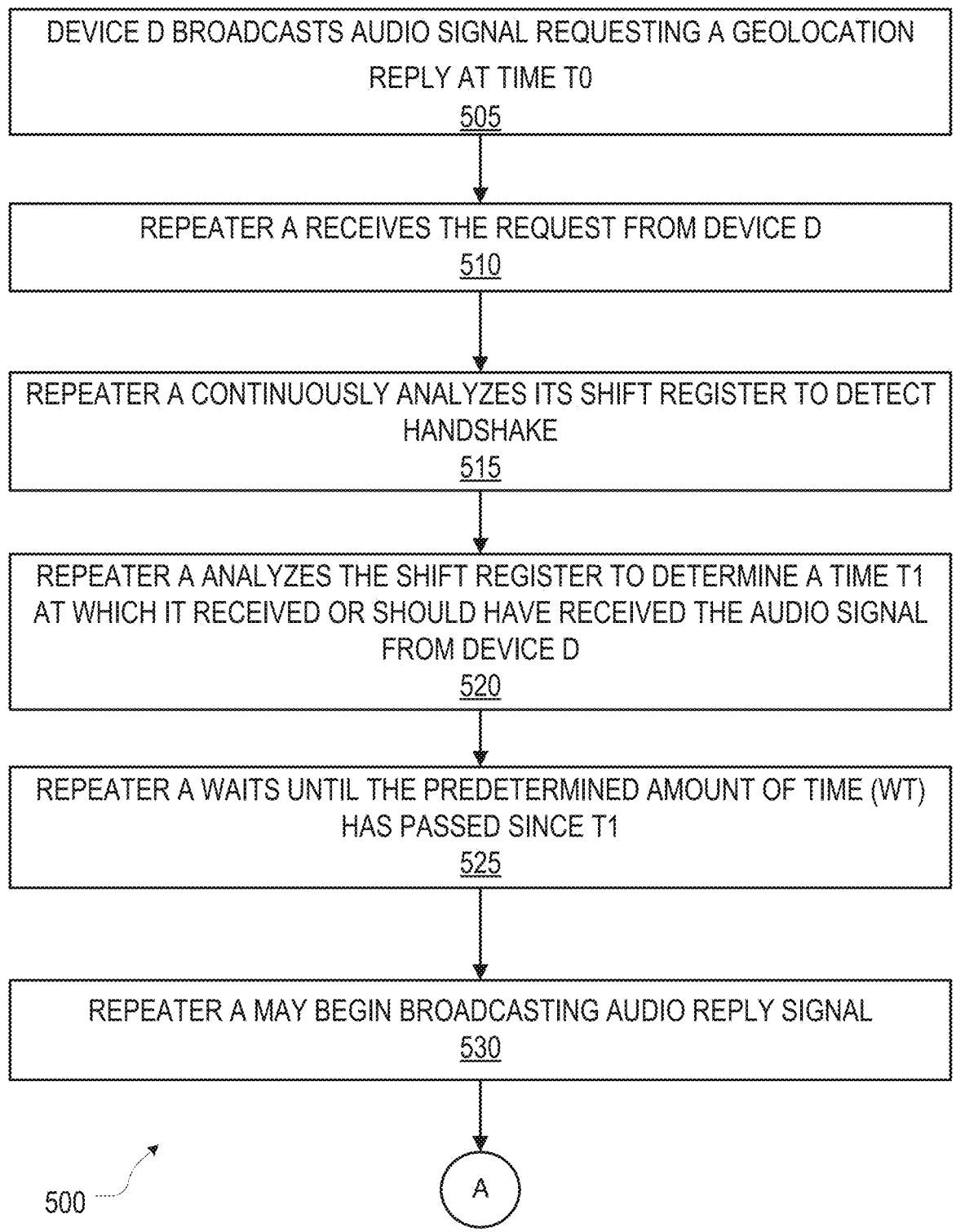
FIGS. 5A-5B (collectively FIG. 5) are a flow chart illustrating one method of determining a distance between two devices in an indoor location, consistent with some embodiments.
Figure 5B:
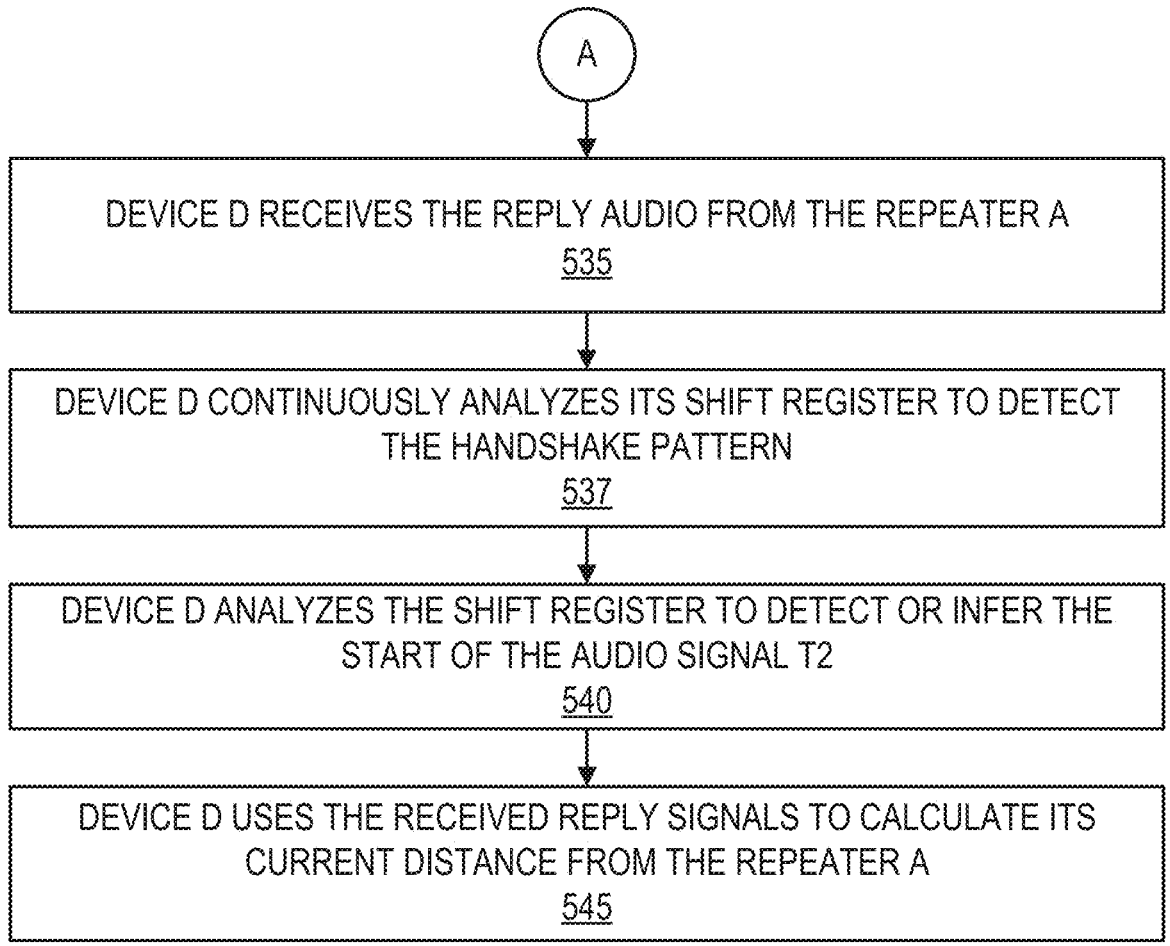

FIGS. 5A-5B (collectively FIG. 5) are a flow chart illustrating one method 500 of determining a distance between two devices in an indoor location L, consistent with some embodiments. One of the devices A may comprise an active repeater A in the indoor location L. The active repeater A may be associated with static infrastructure of building, such as one of the active beacons 405 described with reference to FIG. 4, and may have a well-known (i.e., previously established) location. Alternatively, the active repeater A may be mobile device, such as the first mobile device 410, that has previously determined its position using the methods described herein. A second device D, such as the second mobile device 460, may want to obtain its current position within the indoor space S.

At operation 505, device D may send out an audio signal requesting a geolocation reply at time T0. This signal may contain a handshake pattern that the repeater A may use to identify the audio signal within a stream of sampled sound and a unique fingerprint associated with device D. At operation 510, the repeater A may receive the request from device D. This operation 510 may include continuously receiving audio via an attached microphone, sampling the signal from the microphone to convert it into a digital signal, and then storing the sampled digital signal in a shift register. At operation 515, the repeater A may continuously analyze its shift register to detect the handshake.

In response to a detected handshake, the repeater A may then analyze the shift register at operation 520 to determine a time T1 at which it received or should have received the audio signal from device D. That is, time T1 may be directly detected in the shift register, or may be inferred from a position in a data frame containing the fingerprint and/or handshake. The repeater A may then generate a reply signal to be sent back to device D. This reply signal may contain the fingerprint device D, a handshake code, and the geolocation of repeater A. Alternatively, the reply signal may contain the fingerprint, a handshake code, and a second unique identifier ("reply fingerprint") associated with repeater A. The reply fingerprint, in turn, may be used by the receiving device D to query a network server (not shown) for repeater A's location. The handshake code in both embodiments may be the same as that used in the request by device D, or may be a different code to indicate it is a reply from repeater A. This reply signal may be modulated onto a carrier wave having a predetermined frequency. At operation 525, the repeater A may wait until the predetermined amount of time (WT) has passed since T1, i.e., the time it received, or should have received, the start of the audio signal from device D. At operation 530, repeater A may begin broadcasting an audio signal corresponding to the generated audio reply signal using an attached speaker.

At operation 535, device D may receive the reply audio from the repeater A. This operation 535 may include continuously receiving audio via an attached microphone, sampling the audio to convert it into a digital signal, and then storing the sampled audio in its shift register. At operation 537, the device D may continuously analyze its shift register to detect the handshake pattern. In response to a detected handshake, device D may analyze the shift register to detect or infer the start of the audio signal T2 at operation 540. At operation 545, device D may use the received reply signals to calculate its current distance from the repeater A.

Figure 6A:
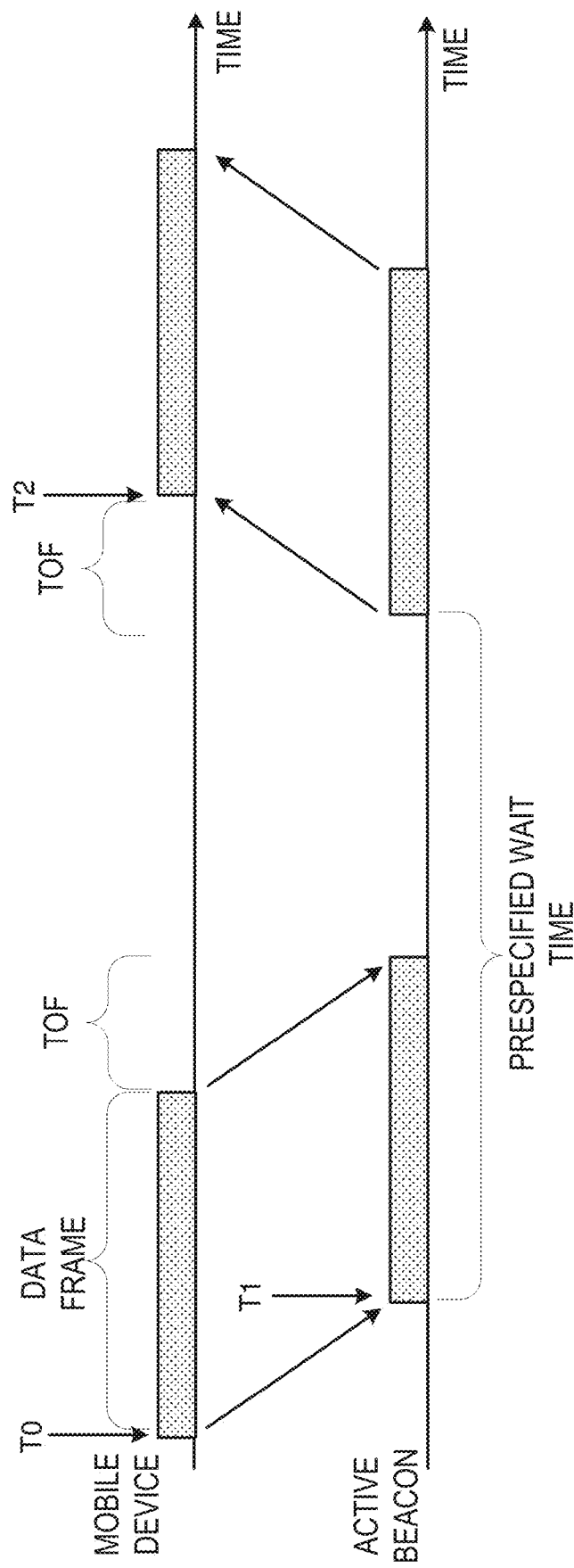
FIGS. 6A and 6B illustrate methods of calculating distance using a signal time of flight (ToF), consistent with some embodiments.
Figure 6B:
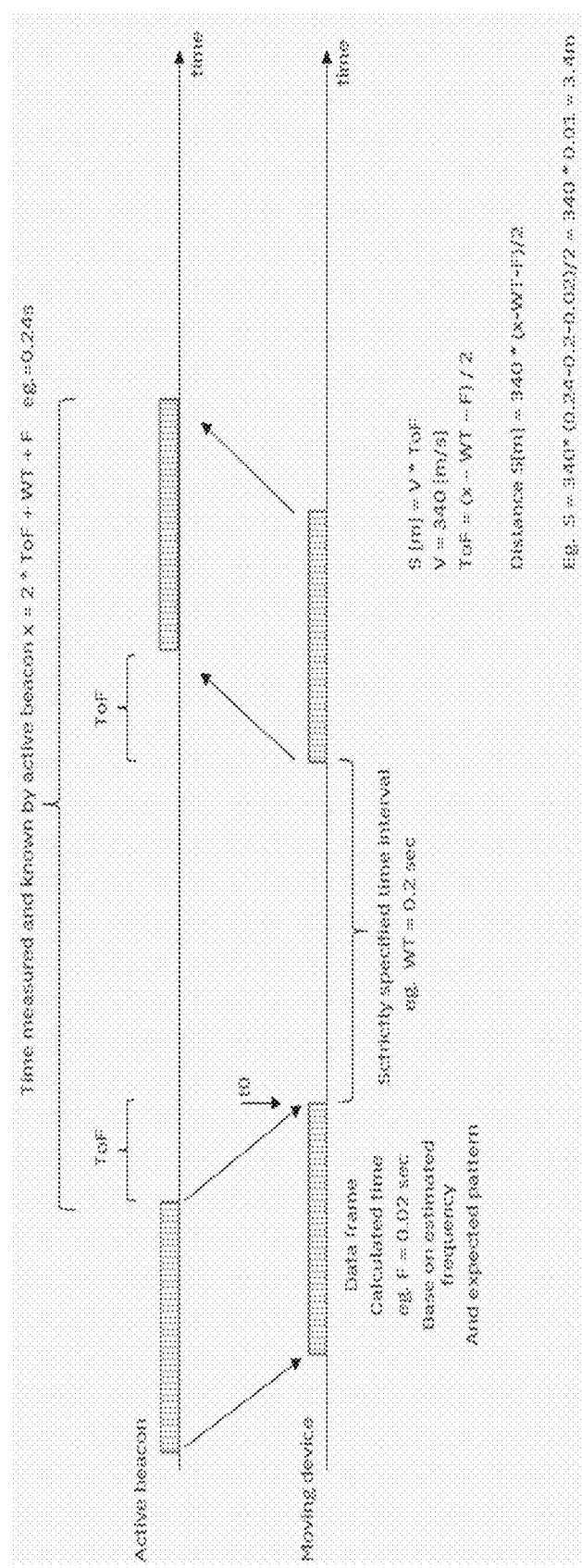
Figure 7B:
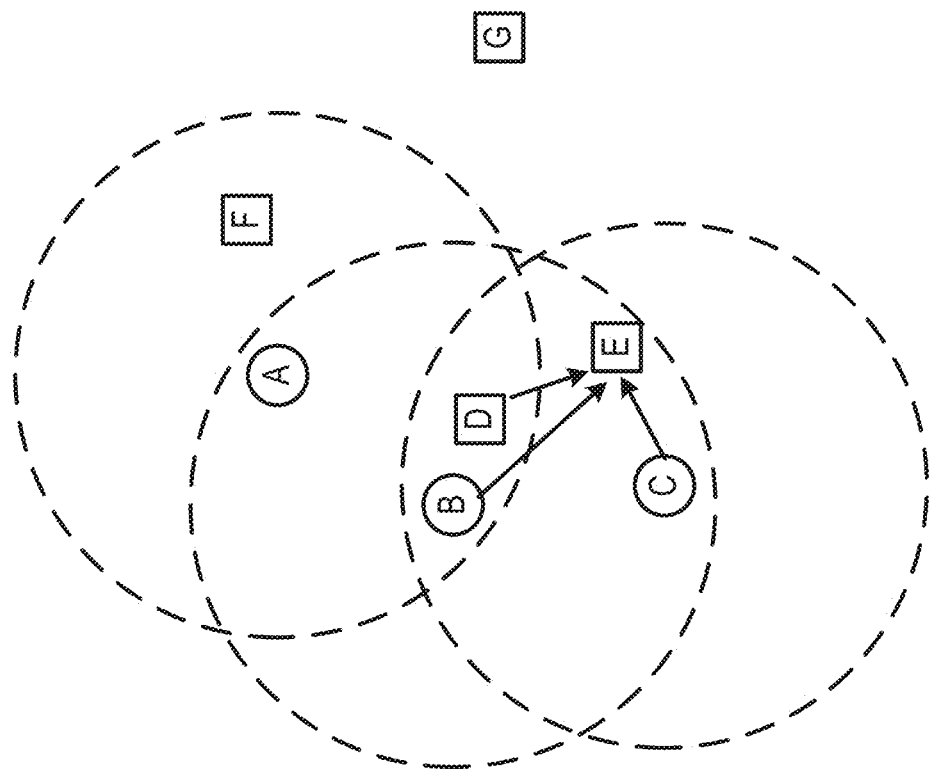
FIGS. 7A-7D illustrate a method of establishing an ad hoc geolocation network using one or more mobile devices that have already established or know their geolocation, consistent with some embodiments.
Figure 7A:
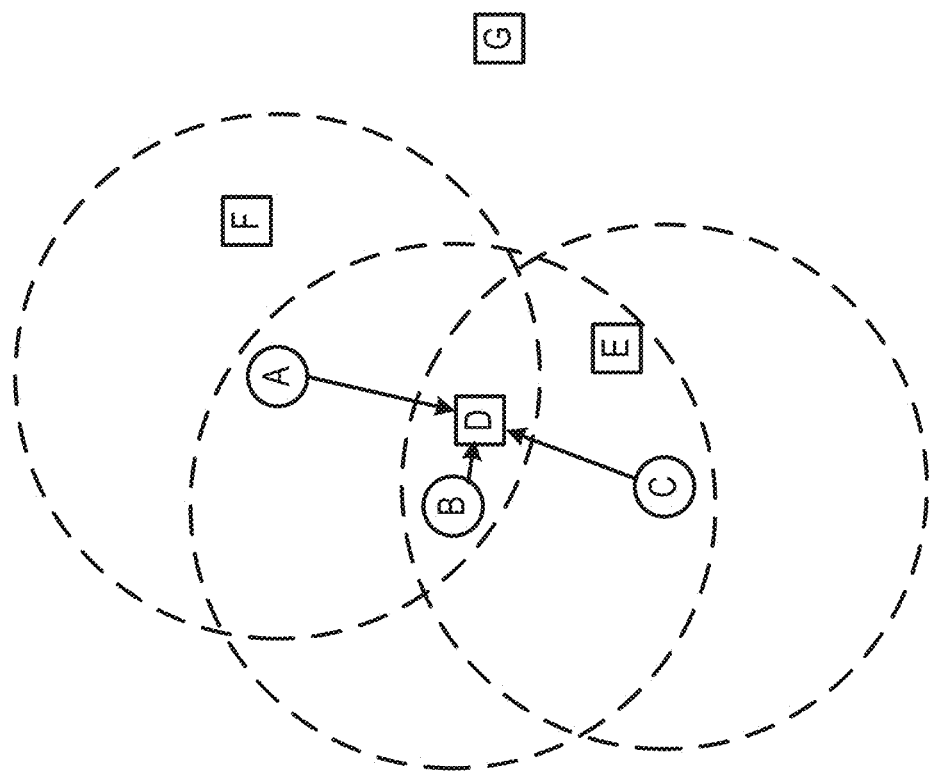
Figure 7D:
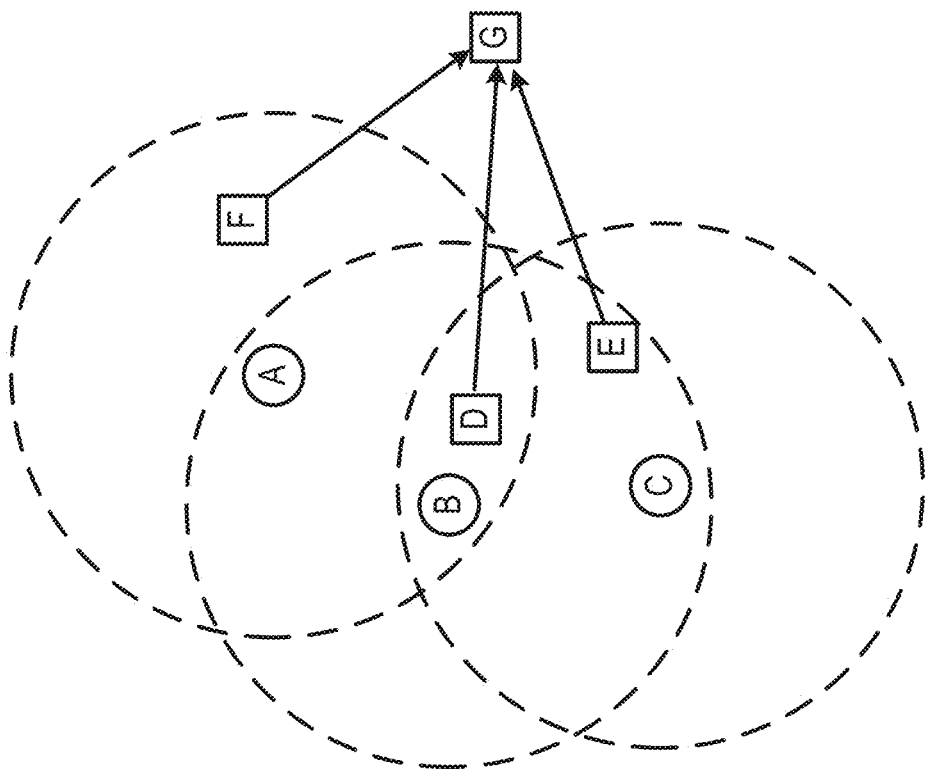
Figure 7C:
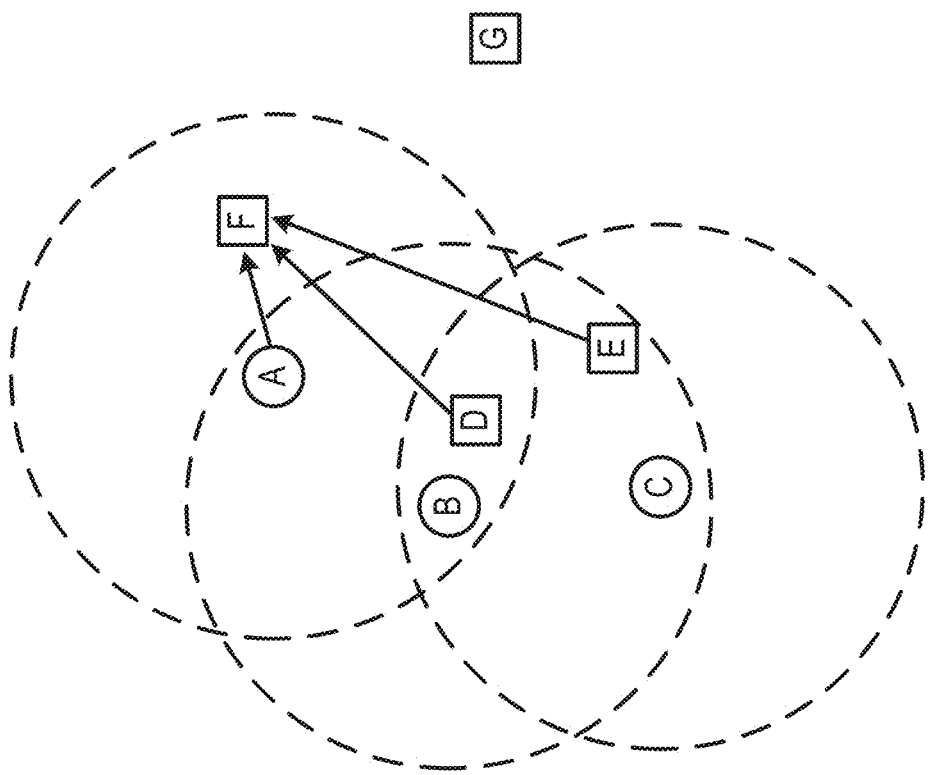

FIGS. 6A and 6B illustrate methods of calculating distance using a signal time of flight (ToF), consistent with some embodiments. In the embodiment shown in FIG. 6A, ToF may be equal one-half of the total time between the start of its initial transmission T0 and the start of the reply transmission T2, minus known WT time reduced by the known length of one data frame. The distance between devices "s" can be then calculated using speed of sound propagation in the air and the calculated ToF(s). As an illustrative example, if beacons A, B, and C are located in a room at geolocation coordinates:

A={0, 0, 0}
B={3.5 m, 0, 0}
C={0, 2.7 m, 0} and the measured distances from device D to each beacon A, B, and C is:

{2.5 m, 3.5 m, 3 m} then the distance can be calculated by solving the following set of simultaneous equations:

$$x^2+y^2+z^2=2.5^2$$

$$(x-b\ 3.5)^2+y^2+z^2=3.5^2$$

$$x^2+(y-2.7)^2+z^2=3^2$$

x>0
y>0
z>0 which will establish that device D is at geolocation coordinates {0.9, 0.8, 2.5}.

Other methods for calculating distance using ToF are within the scope of this disclosure. For example, in the embodiment shown in FIG. 6B, the time from the end of a received frame until the start of the response on the active device side may be used as the wait time (WT). In these embodiments, the time measured by the active device may be 2*ToF+WT+F, where "F" is the length of the data frame in seconds. The distance between devices "s" can again be then calculated using speed of sound propagation in the air and the calculated ToF(s). The speed of sound propagation in air, in turn, may be an average value for typical room temperatures and pressures in some embodiments. In other embodiments, the speed of sound propagation in the air may be calculated using the current, measured air temperature and pressure in this specific indoor space 415. The latter embodiments may be particularly desirable in applications in which high levels of accuracy are desired.

FIGS. 7A-7D illustrate a method 700 of establishing an ad hoc geolocation network using one or more mobile devices D (such as first mobile device 410) that have already established or know their geolocation, consistent with some embodiments. This method 700 may extend the reach of permanent beacons A, B, C (such as beacon 405) to support one or more second mobile devices E, F, and G (such as second mobile device 460). In a first phase of the method 700, depicted in FIG. 7A, mobile devices D, E, F, and G are positioned in an indoor space S, but only device D is in range of signals coming from the permanent beacons A, B, and C. Device [D] may determine its position in the space S using response signals from permanent beacons A, B, and C, and their respective well known geolocations. In a second phase of the example, depicted in FIG. 7B, device E may determine its position in the space S using beacons B and C, and further supported by device D. In a third phase of the example, depicted in FIG. 7C, device G may assess its position using permanent beacon A and devices D and E. In a fourth phase of the example, depicted in FIG. 7D, device G may determine its geolocation based on devices D, E, and F. In this example, device G only used other mobile devices to determine its geolocation, i.e., none of the permanent beacons A, B, and C that are not associated with the building's infrastructure.

Referring again to FIG. 4, some embodiments may use deep learning to identify the handshake patterns and/or to perform some of the calculations. One feature and advantage of some embodiments is that they may offer flexibility to measure distance, and thus geolocation, without calibration and in a noisy environment. Deep learning and/or streaming analysis may also provide the capability to use a signal with frequency fluctuation as the fingerprint pattern does not change.

The AI models 425 in some embodiments may be any software system that recognizes patterns. In some embodiments, the AI models 425 may comprise a plurality of artificial neurons interconnected through connection points called synapses or gates. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The AI models 425 may be trained to solve a specific problem (e.g., of recognizing a handshake in a signal) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function.

Figure 8A:
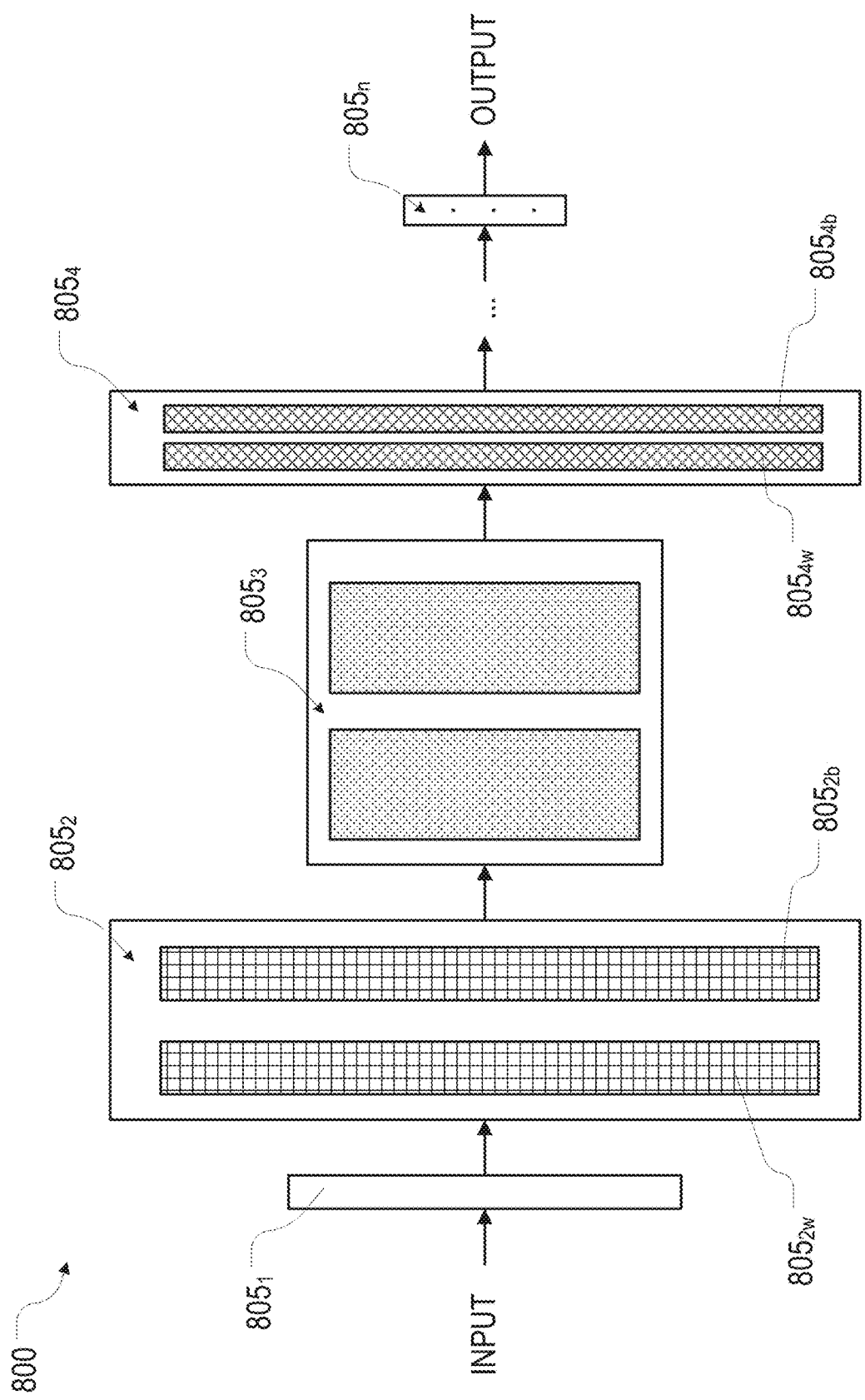
FIG. 8A illustrates an example AI model, consistent with some embodiments.

In some embodiments, the artificial neurons may be organized into layers. FIG. 8A illustrates an example AI model 425, consistent with some embodiments. The AI model 425 in FIG. 8A comprises a plurality of layers $805_1$-$805_n$. Each of the layers comprises weights $805_{1w}$-$805_{nw}$ and biases $805_{1b}$-$805_{nb}$ (only some labeled for clarity). The layer $805_1$ that receives external data is the input layer. The layer $805_n$ that produces the ultimate result is the output layer. Some embodiments include a plurality of hidden layers $805_2$-$805_{n-1}$ between the input and output layers, and commonly hundreds of such hidden layers. Some of the hidden layers $805_2$-$805_{n-1}$ may have different sizes, organizations, and purposes than other hidden layers $805_2$-$805_{n-1}$. For example, some of the hidden layers in the AI models 425 may be convolution layers, while other hidden layers may be fully connected layers, deconvolution layers, or recurrent layers.

Figure 8B:
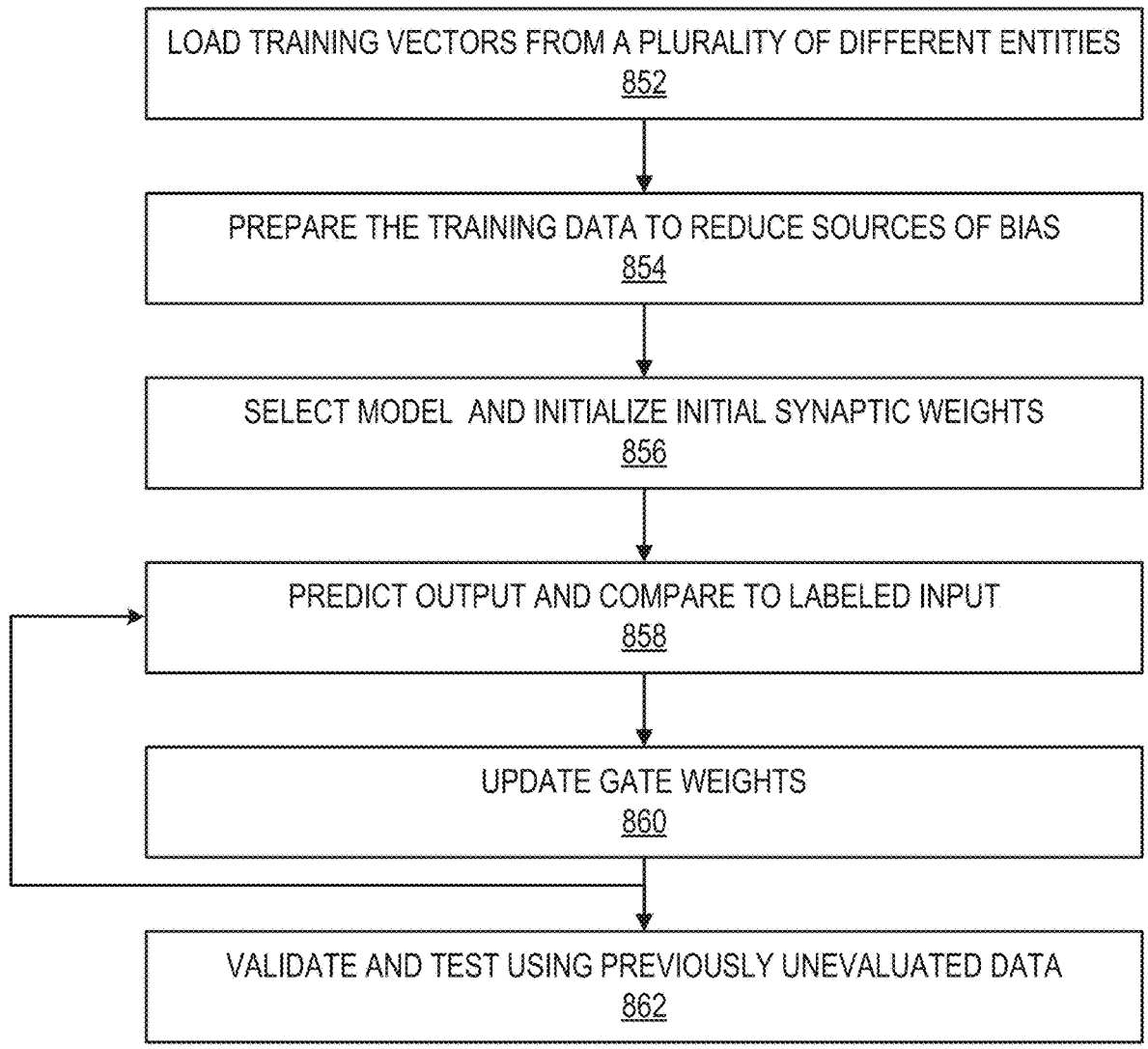
FIG. 8B depicts one embodiment of a AI model training method.

Referring now to FIG. 8B, one embodiment of a AI model training method 850 is depicted. At operation 852, the system receives and loads training data. In this example, the input data-set may include a series of sounds recorded at a number of different beacons 405 and/or mobile devices 410, 460. At operation 854, the training data is prepared to reduce sources of bias, typically including de-duplication, normalization, and order randomization. At operation 856, an AI model 425 is selected for training and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At operation 858, the selected AI model is used to predict an output using the input data element, and that prediction is compared to the corresponding target data. A gradient (e.g., difference between the predicted value and the target value) is then used at operation 860 to update the synaptic weights. This process repeats, with each iteration updating the weights, until the training data is exhausted, or the model reaches an acceptable level of accuracy and/or precision. At operation 862, the resulting model may optionally be compared to previously unevaluated data to validate and test its performance.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example, the beacons 405 may make the initial location request and the mobile devices 410, 460 may respond in some embodiments. These embodiments may be desirable in situations e.g., a hospital or warehouse environment, where an employer may want to track the location of their employees.

Similarly, aspects of the disclosure may be embodied as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the terminology used herein was chosen to explain the principles of the embodiments, the practical application or technical improvement over technologies found in the marketplace, or to enable others of ordinary skill in the art to understand the embodiments disclosed herein. Therefore, it is desired that the embodiments described herein be considered in all respects as illustrative, not restrictive, and that reference be made to the appended claims for determining the scope of the invention.

What is claimed is:

1. A method for geolocating a mobile computing device within an indoor environment, comprising:
   generating a geolocation request audio signal by a speaker of a first mobile device starting at a first point in time, the geolocation request including a fingerprint associated with the first mobile device;
   receiving, by a microphone of the first mobile device, a reply audio signal from a second device;
   extracting, by one or more processors of the first mobile device, information encoded in the reply audio signal, wherein the information encoded in the reply audio signals comprises a handshake pattern and the fingerprint, and wherein the extracting comprises:
   sampling the reply audio signal;
   storing the sampled audio signal in a first shift register; and
   generating a confidence level that the sampled audio signal in the first shift register contains the handshake pattern, and in response to the confidence level exceeding a predetermined threshold, storing the sampled audio signal in a second shift register, wherein generating the confidence level comprises providing the sampled audio signal in the first shift register to a trained machine learning model executing on the first device;
   estimating, by the one or more processors, a receipt time by the first mobile device for the reply audio signal, wherein estimating the receipt time for the reply audio signal comprises matching the handshake pattern to a predetermined data frame; and
   calculating a first time of flight (TOF) using the first point in time and the estimated receipt time for a second audio signal.

2. The method of claim 1, wherein the first device comprises a smartphone and the second device comprises a first repeater beacon located at a known location in an indoor environment.

3. The method of claim 1, further comprising calculating an estimated start time for the reply signal using the sampled audio signal in the second shift register.

4. The method of claim 1, wherein the first device comprises a smartphone.

5. The method of claim 1, wherein the second device comprises a first repeater beacon located at a known location in an indoor environment.

6. The method of claim 1, further comprising generating, by the one or more processors, directions from the first mobile device to an item in the indoor environment.

7. The method of claim 6, wherein the item is a smartphone.

8. The method of claim 6, wherein the item is a tablet.

9. The method of claim 6, wherein the item is a laptop.

10. The method of claim 6, wherein the item is a wearable device.

11. The method of claim 6, wherein the item is a personal digital assistant.

12. A method for geolocating a mobile computing device within an indoor environment, comprising:
- generating a geolocation request audio signal by a speaker of a first mobile device starting at a first point in time, the geolocation request including a fingerprint associated with the first mobile device, wherein the first device comprises a smartphone and a second device comprises a first repeater beacon located at a known location in an indoor environment;
- receiving, by a microphone of the first mobile device, a reply audio signal from a second device;
- extracting, by one or more processors of the first mobile device, information encoded in the reply audio signal, wherein the information encoded in the reply audio signals comprises a handshake pattern and the fingerprint;
- estimating, by the one or more processors, a receipt time by the first mobile device for the reply audio signal, wherein estimating the receipt time for the reply audio signal comprises matching the handshake pattern to a predetermined data frame;
- calculating a first time of flight (TOF) using the first point in time and the estimated receipt time for a second audio signal;
- calculating a distance from the first device to the first repeater beacon using the calculated first TOF;
- receiving, by the microphone of the first mobile device, a third audio signal from a second repeater beacon device and a fourth audio signal from a third repeater beacon;
- extracting, by the one or more processors, information encoded in the third audio signal and the fourth audio signal;
- estimating, by the one or more processors, a receipt time for the third audio signal by the first device and a receipt time for the fourth audio signal by the first mobile device;
- calculating a second TOF and third TOF using the first point in time and the estimated receipt times of the third and fourth audio signals;
- calculating a distance from the first device to the second and third repeater beacons using the calculated second TOF and third TOF;
- calculating the geolocation using the first TOF, the second TOF, and the third TOF;
- receiving, by a microphone of the first mobile device, a geolocation request generated by a second mobile device;
- extracting, by the one or more processors, a fingerprint associated with the second mobile device encoded in the received geolocation request;
- estimating, by the one or more processors, a receipt time for a fifth audio signal;
- generating, by the one or more processors, a reply signal to the received geolocation request, the reply signal including the fingerprint associated with the second mobile device and the calculated geolocation; and
- transmitting, by the speaker of the first mobile device after a predetermined wait time after the estimated receipt time, the reply signal.

13. The method of claim 12, further comprising generating, by the one or more processors, directions from the first mobile device to an item in the indoor environment.

14. The method of claim 12, further comprising calculating an estimated start time for the reply signal using a sampled audio signal in a second shift register.

15. The method of claim 13, wherein the item is a smartphone.

16. The method of claim 13, wherein the item is a tablet.

17. The method of claim 13, wherein the item is a laptop.

18. The method of claim 13, wherein the item is a wearable device.

19. The method of claim 13, wherein the item is a personal digital assistant.

20. A method for geolocating a mobile computing device within an indoor environment, comprising:
- generating a geolocation request audio signal by a speaker of a first mobile device starting at a first point in time, the geolocation request including a fingerprint associated with the first mobile device, wherein the first device comprises a smartphone and a second device comprises a first repeater beacon located at a known location in an indoor environment;
- receiving, by a microphone of the first mobile device, a reply audio signal from a second device;
- extracting, by one or more processors of the first mobile device, information encoded in the reply audio signal, wherein the information encoded in the reply audio signals comprises a handshake pattern and the fingerprint;
- estimating, by the one or more processors, a receipt time by the first mobile device for the reply audio signal, wherein estimating the receipt time for the reply audio signal comprises matching the handshake pattern to a predetermined data frame;
- calculating a first time of flight (TOF) using the first point in time and the estimated receipt time for a second audio signal;
- calculating a distance from the first device to the first repeater beacon using the calculated first TOF;
- receiving, by the microphone of the first mobile device, a third audio signal from a second repeater beacon device and a fourth audio signal from a third repeater beacon;
- extracting, by the one or more processors, information encoded in the third audio signal and the fourth audio signal;
- estimating, by the one or more processors, a receipt time for the third audio signal by the first device and a receipt time for the fourth audio signal by the first mobile device;
- calculating a second TOF and third TOF using the first point in time and the estimated receipt times of the third and fourth audio signals;
- calculating a distance from the first device to the second and third repeater beacons using the calculated second TOF and third TOF;
- calculating the geolocation using the first TOF, the second TOF, and the third TOF;
- receiving, by a microphone of the first mobile device, a geolocation request generated by a second mobile device;
- extracting, by the one or more processors, a fingerprint associated with the second mobile device encoded in the received geolocation request;
- estimating, by the one or more processors, a receipt time for a fifth audio signal;
- generating, by the one or more processors, a reply signal to the received geolocation request, the reply signal including the fingerprint associated with the second mobile device and the calculated geolocation;

transmitting, by the speaker of the first mobile device after a predetermined wait time after the estimated receipt time, the reply signal;
generating, by the one or more processors, directions from the first mobile device to an item in the indoor environment; and
calculating an estimated start time for the reply signal using a sampled audio signal in a second shift register.

* * * * *